(12) United States Patent
Danilov et al.

(10) Patent No.: US 11,212,175 B2
(45) Date of Patent: Dec. 28, 2021

(54) CONFIGURATION MANAGEMENT FOR CLOUD STORAGE SYSTEM AND METHOD

(71) Applicant: EMC IP HOLDING COMPANY LLC, Hopkiinton, MA (US)

(72) Inventors: Mikhail Danilov, Saint Petersburg (RU); Mikhail Malygin, Saint Petersburg (RU); Ivan Tchoub, Saint Petersburg (RU); Andrey Fomin, Vesevolozhsk (RU); Konstantin Buinov, Leningradskaya area (RU)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 123 days.

(21) Appl. No.: 15/422,968

(22) Filed: Feb. 2, 2017

(65) Prior Publication Data

US 2017/0373930 A1   Dec. 28, 2017

(51) Int. Cl.
*G06F 15/16* (2006.01)
*H04L 12/24* (2006.01)
*H04L 29/08* (2006.01)

(52) U.S. Cl.
CPC ........ *H04L 41/082* (2013.01); *H04L 67/1097* (2013.01); *H04L 41/0893* (2013.01)

(58) Field of Classification Search
CPC ............... H04L 41/082; H04L 67/1097; H04L 41/0803; H04L 67/1044; H04L 41/22
USPC ........................................................ 709/221
See application file for complete search history.

(56) References Cited

U.S. PATENT DOCUMENTS

| 8,856,335 | B1 * | 10/2014 | Yadwadkar | G06F 9/465 |
| | | | | 709/226 |
| 9,633,051 | B1 * | 4/2017 | Maccanti | G06F 11/1469 |
| 2002/0161869 | A1 * | 10/2002 | Griffin | G06F 9/3885 |
| | | | | 709/221 |
| 2010/0046426 | A1 * | 2/2010 | Shenoy | H04W 84/20 |
| | | | | 370/328 |
| 2011/0138475 | A1 * | 6/2011 | Gordon | H04L 9/085 |
| | | | | 726/26 |
| 2014/0119221 | A1 * | 5/2014 | Park | H04L 41/5038 |
| | | | | 370/252 |

(Continued)

FOREIGN PATENT DOCUMENTS

WO   WO-2013144705 A1 * 10/2013 ............. G05B 15/02
WO   WO-2016106486 A1 * 7/2016 ........... H04L 41/044

OTHER PUBLICATIONS

Automated modular file-based distributed configuration management for Unix servers of heterogeneous applications A. Aminoff Proceedings of the IEEE Third International Workshop on Systems Management (Year: 1998).*

(Continued)

*Primary Examiner* — Oscar A Louie
*Assistant Examiner* — Oluwatosin M Gidado
(74) *Attorney, Agent, or Firm* — Brian J. Colandreo; Mark H. Whittenberger; Holland & Knight LLP

(57) ABSTRACT

A method, computer program product, and computer system for receiving a change to a configuration parameter associated with a first cluster node in a cluster configuration. The configuration parameter may be stored in a shared cluster memory. The configuration parameter may be distributed from the shared cluster memory to the cluster configuration.

20 Claims, 7 Drawing Sheets

(56) References Cited

U.S. PATENT DOCUMENTS

| | | | |
|---|---|---|---|
| 2016/0085772 A1* | 3/2016 | Vermeulen | G06F 16/21 |
| | | | 707/615 |
| 2016/0094647 A1* | 3/2016 | Mordani | G06F 16/213 |
| | | | 709/226 |
| 2017/0027004 A1* | 1/2017 | Lu | H04W 12/06 |

OTHER PUBLICATIONS

BCFG: a configuration management tool for heterogeneous environments Desai; Lusk; Bradshaw; Evard 2003 Proceedings IEEE International Conference on Cluster Computing (Year: 2003).*

* cited by examiner

CONFIGURATION MANAGEMENT FOR CLOUD STORAGE SYSTEM AND METHOD

RELATED APPLICATION

The subject application claims the priority of Russia Patent Application No. 2016124793, filed on 22 Jun. 2016, the contents of which are herein incorporated by reference in its entirety.

BACKGROUND

Generally, with the increasing amounts of information being stored, storage systems may become more complex and more distributed. As such, it may be beneficial to efficiently and reliably manage/administrate them. While there may be numerous techniques for managing/administrating these storage systems, each technique may have tradeoffs between reliability and efficiency.

BRIEF SUMMARY OF DISCLOSURE

In one example implementation, a method, performed by one or more computing devices, may include but is not limited to receiving a change to a configuration parameter associated with a first cluster node in a cluster configuration. In some implementations, the configuration parameter may be stored in a shared cluster memory. In certain implementations, the configuration parameter may be distributed from the shared cluster memory to the cluster configuration.

One or more of the following example features may be included. In some implementations, the configuration parameter may include at least one of a mode, a state, and a numerical parameter of at least one storage service running on the first cluster node. In certain implementations, the cluster configuration may be shown as a single view for each storage service running on a plurality of cluster nodes in the cluster configuration. In other implementations, the cluster configuration may be organized as a tree structure. In certain implementations, the configuration update may be applied to a plurality of cluster nodes in the cluster configuration. In some implementations, the configuration update may be limited to the first cluster. In other implementations, the configuration update may be limited to a single replication group.

In another example implementation, a computing system may include one or more processors and one or more memories configured to perform operations that may include but are not limited to receiving a change to a configuration parameter associated with a first cluster node in a cluster configuration. In some implementations, the configuration parameter may be stored in a shared cluster memory. In certain implementations, the configuration parameter may be distributed from the shared cluster memory to the cluster configuration.

One or more of the following example features may be included. In some implementations, the configuration parameter may include at least one of a mode, a state, and a numerical parameter of at least one storage service running on the first cluster node. In certain implementations, the cluster configuration may be shown as a single view for each storage service running on a plurality of cluster nodes in the cluster configuration. In other implementations, the cluster configuration may be organized as a tree structure. In certain implementations, the configuration update may be applied to a plurality of cluster nodes in the cluster configuration. In some implementations, the configuration update may be limited to the first cluster. In other implementations, the configuration update may be limited to a single replication group.

In another example implementation, a computer program product may reside on a computer readable storage medium having a plurality of instructions stored thereon which, when executed across one or more processors, may cause at least a portion of the one or more processors to perform operations that may include but are not limited to receiving a change to a configuration parameter associated with a first cluster node in a cluster configuration. In some implementations, the configuration parameter may be stored in a shared cluster memory. In certain implementations, the configuration parameter may be distributed from the shared cluster memory to the cluster configuration.

One or more of the following example features may be included. In some implementations, the configuration parameter may include at least one of a mode, a state, and a numerical parameter of at least one storage service running on the first cluster node. In certain implementations, the cluster configuration may be shown as a single view for each storage service running on a plurality of cluster nodes in the cluster configuration. In other implementations, the cluster configuration may be organized as a tree structure. In certain implementations, the configuration update may be applied to a plurality of cluster nodes in the cluster configuration. In some implementations, the configuration update may be limited to the first cluster. In other implementations, the configuration update may be limited to a single replication group.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
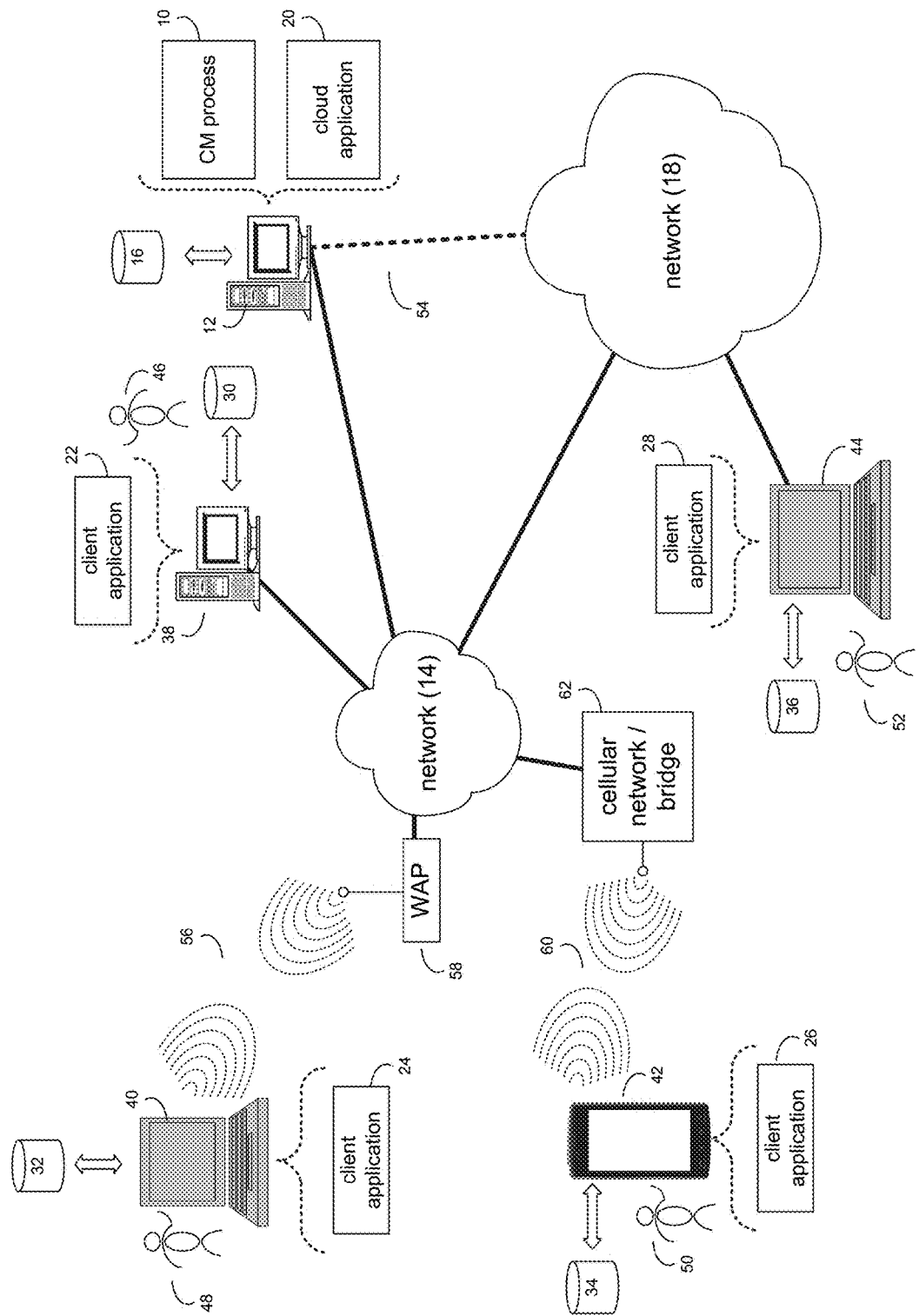
FIG. 1 is an example diagrammatic view of a CM process coupled to a distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. In some implementations, each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown CM process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, a configuration management process, such as the configuration management (CM) process 10 of FIG. 1, may receive a change to a configuration parameter associated with a first cluster node in a cluster configuration. In some implementations, the configuration parameter may be stored in a shared cluster memory. In certain implementations, the configuration parameter may be distributed from the shared cluster memory to the cluster configuration.

In some implementations, the instruction sets and subroutines of CM process, such as CM process 10, which may be stored on a storage device, such as storage device 16 coupled to computer 12, may be executed by one or more processors and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In certain embodiments, a data store may also be a custom database, such as, for example, a flat file database or an XML database. In other embodiments another form(s) of a data storage structure and/or organization may also be used. In certain implementations, a CM process may be a component of the data store, a standalone application that interfaces with the above noted data store and/or an applet/application that is accessed via client applications, such as client applications 22, 24, 26, 28. In many implementations, a data store may be, in whole or in part, distributed in a cloud computing topology. In certain implementations, computer 12 and storage device 16 may refer to multiple devices, which may also be distributed throughout the network. An example cloud computing environment that may be used with the disclosure may include but is not limited to, e.g., Elastic Cloud Storage (ECS™) from EMC Corporation of Hopkinton, Mass. In some implementations, other cloud computing environments may be used without departing from the scope of the disclosure.

In some implementations, computer 12 may execute a cloud application (e.g., cloud application 20), examples of which may include, but are not limited to, e.g., a storage system application, a cloud computing application, a data synchronization application, a data migration application, a configuration management application, a microservice application, or other application that allows for the implementation and/or management of configurations in a clustered (or non-clustered) environment (or the like). In certain embodiments, CM process 10 and/or cloud application 20 may be accessed via client applications 22, 24, 26, 28. CM process 10 may be a standalone application, or may be an applet/application/script/extension that may interact with and/or be executed within cloud application 20, a component of cloud application 20, and/or one or more of client applications 22, 24, 26, 28. In certain implementations, a cloud application may be a standalone application, or may be an applet/application/script/extension that may interact with and/or be executed within a CM process, a component of CM process, and/or one or more of client applications, such as client applications 22, 24, 26, 28. In some implementations, one or more of client applications 22, 24, 26, 28 may be a standalone application, or may be an applet/application/script/extension that may interact with and/or be executed within and/or be a component of CM process 10 and/or cloud application 20. Examples of client applications 22, 24, 26, 28 may include, but are not limited to, e.g., a storage system application, a cloud computing application, a data synchronization application, a data migration application, a configuration management application, a microservice application, or other application that allows for the implementation and/or management of configurations in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. In certain implementations, the instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

In some implementations, storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of CM process 10 (and vice versa). Accordingly, in certain implementations, CM process 10 may be a purely server-side application, a purely client-side application, or a hybrid server-side/client-side application that is cooperatively executed by one or more of client applications 22, 24, 26, 28 and/or CM process 10.

In some implementations, one or more of client applications 22, 24, 26, 28 may be configured to effectuate some or all of the functionality of cloud application 20 (and vice versa). Accordingly, in different implementations, cloud application 20 may be a purely server-side application, a purely client-side application, or a hybrid server-side/client-side application that is cooperatively executed by one or more of client applications 22, 24, 26, 28 and/or cloud application 20. In some implementations, as one or more of client applications 22, 24, 26, 28, CM process 10, and cloud application 20, taken singly or in any combination, may effectuate some or all of the same functionality, any description of effectuating such functionality via one or more of client applications 22, 24, 26, 28, CM process 10, cloud application 20, or combination thereof, and any described interaction(s) between one or more of client applications 22, 24, 26, 28, CM process 10, cloud application 20, or combination thereof to effectuate such functionality, should be taken as an example only and not to limit the scope of the disclosure.

In some implementations, users 46, 48, 50, 52 may access computer 12 and CM process 10 (e.g., using one or more of client electronic devices 38, 40, 42, 44) directly through network 14 or through secondary network 18. Further, computer 12 may be connected to network 14 through secondary network 18, as illustrated with phantom link line 54. In certain implementations, CM process 10 may include one or more user interfaces, such as browsers and textual or graphical user interfaces, through which users 46, 48, 50, 52 may access CM process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
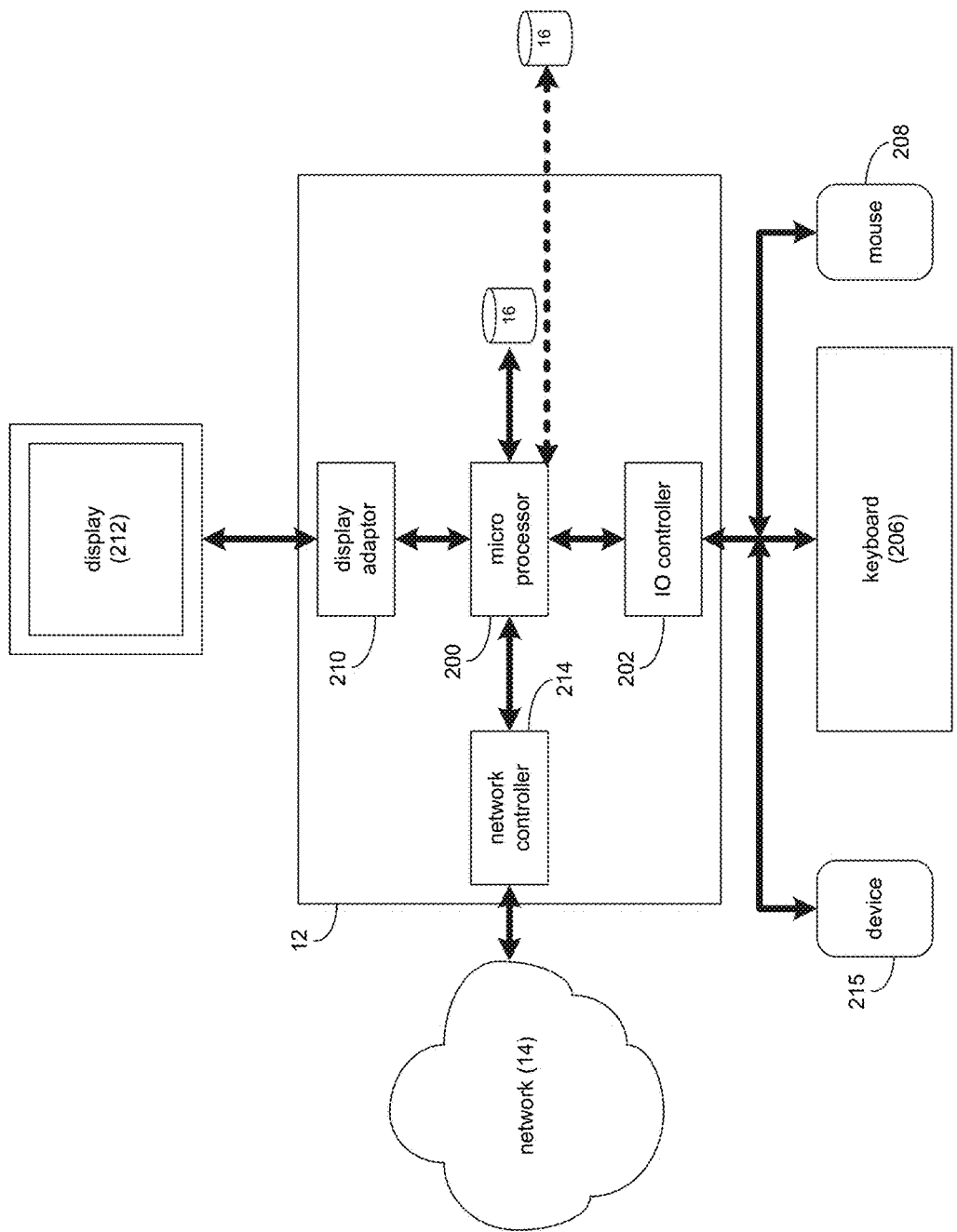
FIG. 2 is an example diagrammatic view of a client electronic device of FIG. 1 according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, any computing device capable of executing, in whole or in part, CM process 10 may be substituted for computer 12 (in whole or in part) within FIG. 2, examples of which may include but are not limited to client electronic devices 38, 40, 42, 44.

In some implementations, computer 12 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 16). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 3:
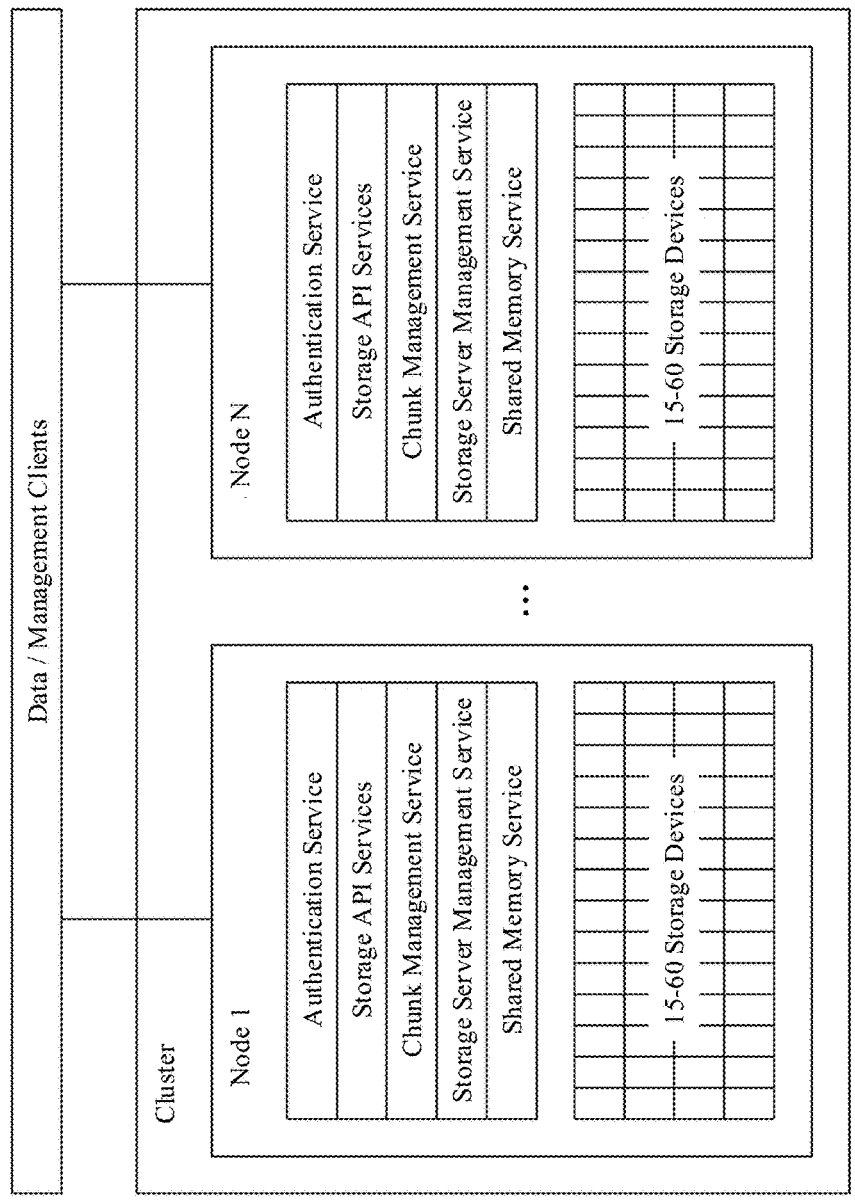
FIG. 3 is an example diagrammatic view of a high level architecture of a cluster according to an example implementation of the disclosure.
Figure 4:
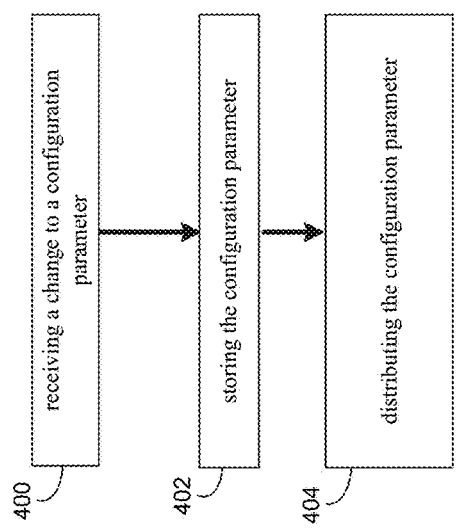
FIG. 4 is an example flowchart of a CM process according to an example implementation of the disclosure.

Refer now to the example implementation of FIG. 3, in which cluster 300 may consist of one or more storage nodes (e.g., hardware and/or virtual nodes). In some implementations, the one or more storage nodes may include one or more of the above-noted computing devices. In this implementation, each storage node may manage (e.g., via CM process 10 and/or cloud application 20) several storage devices. In some implementations, the storage devices of a cluster, such as cluster 300, may include, e.g., hard disk drives, aka HDDs and/or solid state drives, aka SSDs. In some implementations, the HDDs may be used to store user data (e.g., comment, description, tag, etc.) and system metadata. For example in certain implementations, user data may be content of a block/file/object received from a client application (such as client application 22 of FIG. 1). In other implementations, other types of storage devices may be used without departing from the scope of the disclosure. In some implementations, other example clusters may be used without departing from the scope of the disclosure.

In certain implementations, a single node of cluster 300 that runs on a hardware appliance may manage, e.g., from 15 to 60 storage devices, although more or less storage devices may also be managed. In some implementations, each node may run (e.g., via CM process 10 and/or cloud application 20) a number of services, which may together implement a storage business logic. For instance, in some implementations, a single node may manage around 20 services, although more or less services may also be managed.

In certain implementations, cluster 300 does not employ traditional monolithic storage architecture. Instead, in some implementations, cluster 300 may apply some key elements of Microservice Architecture pattern. According to this pattern, in some implementations, complex software systems may be composed of small and highly decoupled processes, which may be referred to as microservices. Generally, each of the processes may be small and narrowly focused on doing single small tasks. In certain implementations, it may be difficult to implement a system as a set of absolutely independent processes, and as such, microservices may communicate with each other using language-agnostic APIs.

In general, cluster 300 may contain one or several Virtual Data Centers (VDCs). VDCs may be logical constructs and may be the top-level resource that represents the collection of cluster infrastructure to manage as a unit. In turn, in some implementation, a VDC may contain one or several replication groups (RGs), where RGs may be logical constructs that define where particular content is protected. Generally, when one RG belongs to two or more VDCs from different clusters, the RG may protect data objects against storage device (e.g., disk), node, and site failures. Traditionally, a storage service may have an independent set of resources (data structures, threads, etc.) dedicated to a particular RG.

As will be discussed below, in many implementations, there may be requirements to have some kind of configuration management, which may allow the cluster end-user and service personnel to change run mode, enable or disable storage functions, etc. In some implementations, configuration process 10 may enable one or more of the following: (1) Configuration manager may guarantee a single view on the actual configuration for all storage services running on different cluster nodes; (2) Configuration manager may allow storage services to adopt configuration change without node restart; and (3) may naturally handle configuration management in a cloud environment.

The Configuration Management Process:

Referring now also to the example implementation(s) of FIGS. 4-7, a configuration management process, such as the configuration management (CM) process 10 of FIG. 1, may receive 400 a change to a configuration parameter associated with a first cluster node in a cluster configuration. In some implementations, CM process 10 may store 402 the configuration parameter in a shared cluster memory. In certain implementations, CM process 10 may distribute 404 the configuration parameter from the shared cluster memory to the cluster configuration.

Figure 5:
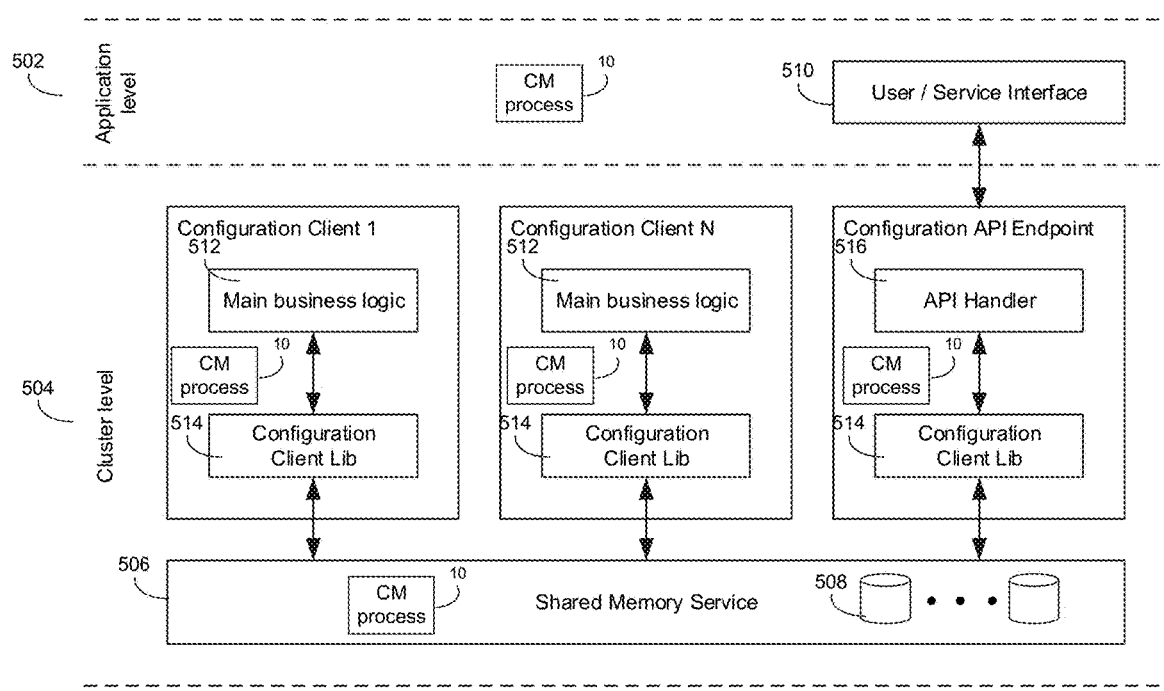
FIG. 5 is an example diagrammatic view of clustered system that may be used with a CM process according to an example implementation of the disclosure.

Referring also to the example implementation of FIG. 5, a high level configuration management in a standalone clustered system 500 is shown. In some implementations, clustered system 500 may include an application level (e.g., application level 502), a cluster level (e.g., cluster level 504), which may include a Shared Memory Level (e.g., Shared Memory Service 506). In certain implementations, application level 502 may include portions of CM process 10 and a User/Service interface (e.g., User/Service interface 510). In other implementations, cluster level 504 may include one or more configuration clients and one or more configuration API endpoints (discussed further below), where at least one configuration API endpoint may be communicatively coupled to the User/Service interface. In some implementations, the configuration clients may include a main business logic (e.g., main business logic 512), a configuration client library (e.g., configuration library 514), and one or more portions of CM process 10. In certain implementations, each storage service that has a configuration may be a configuration client. In other implementations, configuration management development framework may provide the configuration client library, which may be built into each configuration client. In some implementations, the configuration related operations may be accomplished using this configuration client library. In some implementations, configuration client library may encapsulate the configuration specific logic. In other implementations, the configuration API endpoint may include an API handler (e.g., API handler 516), a configuration library, and portions of CM process 10. In some implementations, one or more configuration clients and one or more configuration API endpoints may be communicatively coupled to Shared Memory Service 506.

As noted above, and shown in FIG. 3, in some implementations, the example cluster may have a software build as a set of services. In certain implementations, the cluster may follow a microservice architecture pattern, and there may not necessarily be a dedicated service for configuration management (e.g., such as a Configuration Management Service). In some implementations, CM process 10 may include core functionality of Shared Memory Service 506 and a thin configuration client library to do some or all of the Configuration Management Service.

In some implementations, CM process 10 (e.g., via Shared Memory Service 506) may maintain an actual version of the cluster configuration for clustered system 500. In certain implementations, CM process 10 (e.g., via Shared Memory Service 506) may also provide compare and swap mechanism for concurrent update detection and resolution. In some implementations, compare and swap functions (e.g., via CM process 10) may generally be described as an atomic instruction used in multithreading to achieve synchronization. For instance, compare and swap may compare the contents of a memory location to a given value and, if they are the same, modify the contents of that memory location to a given new value. In some implementations, this may be done as a single atomic operation in some implementations. In certain implementations, the atomicity may guarantee that the new value is calculated based on up-to-date information; if the value had been updated by another thread in the meantime, the write may fail. The result of the operation, in some implementations, may indicate whether it performed the substitution. In some implementations, this may be done either with a boolean response (this variant is often called compare-and-set), or by returning the value read from the memory location (but not the value written to it). As an example implementations, suppose there is some state controlled using CM process 10. In the example, further assume that the following state transitions are valid: A->B and A->C. In some implementations, other state transitions may be forbidden. In certain implementations, two different cluster nodes may trigger two different transitions at the same time. In some implementations, node 1, which in this example may be just a bit faster, may trigger A->B transition. In some implementations, node 2, which in this example may be just a bit slower, may trigger A->C transition. In certain implementations, if CM process 10 does not implement compare and swap (CAS) logic, the scenario may lead to B->C state transition, which is a forbidden one in this example. With CAS logic of CM process 10, the state update may work as follows in the example implementation: change the state to B/C if the current state is A; therefore, node 2 may fail to update the state. In certain implementations where Shared Memory Service 506 supports client-defined triggers, these triggers may be used for notifying configuration clients about cluster configuration changes. For example, suppose configuration of some client is described using the parameters A, B, and C. In some implementations, the configuration client may want to react on configuration changes "instantly". In certain implementations, the client may implement a listener and register it within the client configuration library. In some implementations, the client configuration library may "tell" Shared Memory Service 506 "Send me a signal when somebody/something changes A, B, and C". In some implementations, when some storage service or user changes a value of A, B, or C, Shared Memory Service 506 may "see" there is a trigger associated with A, B, and C and may send a signal to the client configuration library. In certain implementations, the client configuration library may update its view (e.g., snapshot) of the configuration and may call the client-specified listener to handle the configuration change.

In some implementations, CM process 10 (e.g., via the client configuration library) may retrieve a cluster configuration from cluster shared memory during startup. In certain implementations, CM process 10 (e.g., via the client configuration library) may maintain a local up-to-date snapshot of the cluster configuration available to the clients. As will be discussed in detail below, in some implementations, when a configuration update is requested, CM process 10 (e.g., via the client configuration library) may store the new configuration in cluster shared memory, such as cluster shared memory 508. In some implementations, CM process 10 (e.g., via the client configuration library) may use means provided by Shared Memory Service 506 to detect and resolve concurrent configuration updates. In certain implementations, when the cluster configuration is updated from some other node, CM process 10 (e.g., via the client configuration library) may receive notification from Shared Memory Service 506. CM process 10 (e.g., via the client configuration library) may re-reads the cluster configuration and may notify its configuration client about the update. In some implementations, CM process 10 (e.g., via the client configuration library) may manage configuration metadata.

As noted above, in some implementations, cluster level 504 may include a configuration API Endpoint. In certain implementations, CM process 10 (e.g., via the configuration API Endpoint) may handle configuration management related calls from an end user and service personnel applications (e.g., read/update/reset). In some implementations, configuration API Endpoint may not be a dedicated service, but may still be a storage service. Therefore, in some implementations, configuration API Endpoint may also work with the cluster configuration via configuration client library.

In certain implementations, a cluster configuration may be a union of configurations of the configuration clients. Thus, as will be discussed further below, in some implementations, the cluster configuration may be organized as a treelike structure. For example, the cluster configuration may have a root and the configuration clients may connect their configurations to this root. In some implementations, configuration tree nodes (including a root) may be containers for other nodes and leaves. In certain implementations, each tree leaf may be a configuration parameter that may have a value. [In some implementations, the values may include, e.g., for boolean parameters: true or false. As another example, for parameters that are natural numbers: 0 . . . MAX_VALUE. As yet another example, values for states may include: State1, State2, . . . , StateN. In some implementations, each configuration client may initialize its configuration during startup using a configuration definition file. In certain implementations, this metadata may be managed by CM process 10 (e.g., via the client configuration library).

In certain implementations, CM process 10 may receive 400 a change to a configuration parameter associated with a first cluster node in a cluster configuration. In some implementations, the configuration parameter may include at least one of a mode, a state, and a numerical parameter of at least one storage service running on the first cluster node. In some implementations, the cluster configuration may be a set of configuration parameters that may define mode, state (e.g., enabled/disabled), or some numerical parameter of storage services. In certain implementations, these configuration parameters may be changed explicitly or implicitly (e.g., via a user interface of CM process 10) in order to change service mode, or enable/disable some process, or tune performance of some cluster feature, etc. Other example configuration parameters may include, e.g., increase/decrease limits, e.g. max number of data client connections per cluster node; update a parameter that reflects some assumption. For instance, object creation may not take more than 2 weeks. In some implementations, one may want to change the configuration parameter to increase it to, e.g., 4 weeks or decrease it to, e.g., 1 day.

For instance, assume for example purposes only that the cluster supports different run modes and a cluster user wants to switch the storage to, e.g., High Performance mode. In the example, the user (e.g., user 46 via client electronic device 38 and client application 26) may choose the mode using the corresponding controls in the user interface. In some implementations, CM process 10 may translate this received 400 action into a call that may update a configuration parameter (e.g., cluster.modeManager.mode). In this example, the cluster may be a cluster configuration tree root. In some implementations, the "modeManager" portion of cluster.modeManager.mode may be the service that manages storage run mode. In certain implementations, the "mode" portion of cluster.modeManager.mode may be a configuration parameter that represents the current storage run mode. In certain implementations, the call may be handled by CM process 10 (e.g., via the API handler of configuration API endpoint). In some implementations, CM process 10 (e.g., via the configuration client library of configuration API endpoint) may set the new mode value.

In some implementations, CM process 10 may store 402 the configuration parameter in a shared cluster memory. For instance, in certain implementations, CM process 10 (e.g., via the configuration client library of configuration API endpoint and/or configuration client) may create a new version of the configuration based upon the chosen mode and may store 402 it into shared cluster memory 508.

In certain implementations, CM process 10 may distribute 404 the configuration parameter from the shared cluster memory to the cluster configuration. For instance, the new version of the configuration may be distributed 404 across the cluster by CM process 10 (e.g., via Shared Memory Service 506). In some implementations, on each node (including the one that handled the call from the application), CM process 10 (e.g., via Shared Memory Service 506) may receive the new configuration and may detect a change in the Mode Manager's configuration. In some implementations, CM process 10 (e.g., via the Mode Manager service) may be notified about the configuration change. In certain implementations, CM process 10 (e.g., via the configuration client library) may be the entity that handles the notification. CM process 10 (e.g., via the configuration client library) may read the new configuration from the shared cluster memory and may notify the main component of the Mode Manager about the new mode. In some implementations, CM process 10 (e.g., via the Mode Manager service) may switch the mode on the particular cluster node to High Performance.

In certain implementations, the cluster configuration may be shown as a single view for each storage service running on a plurality of cluster nodes in the cluster configuration. For instance, the configuration client library and Shared Manager Service 506 may enable a single view on the actual configuration for some or all storage services running on different cluster nodes. In some implementations, the services that are configuration clients may be notified about configuration changes so that they may adopt the new configuration values on the fly without node restart. For instance, some storages may keep configuration in a file. In some implementations, storage services may read configuration from the file during startup. In certain implementations, when configuration may need to be changed, the file may be updated and the services may be restarted to pick up the new configuration. In some implementations, the storage services may get a notification about the configuration update, may read the new configuration and may apply it without restarting.

While the disclosure may be used with a standalone clustered system, in certain implementations, CM process 10 may be similarly used with cloud specific use cases. An example implementation of a cloud storage system 600 may be shown in the example implementation of FIG. 6. In the example, cloud storage system 600 may include three cloud storage (CS) clusters (e.g., CS1, CS2, and CS3). In some implementations, cloud storage system 600 may include three replication groups (RGs) (e.g., RG1 protected by CS1 and CS2; RG2 protected by CS2 and CS3; and RG3 protected by CS1 and CS3).

Figure 6:
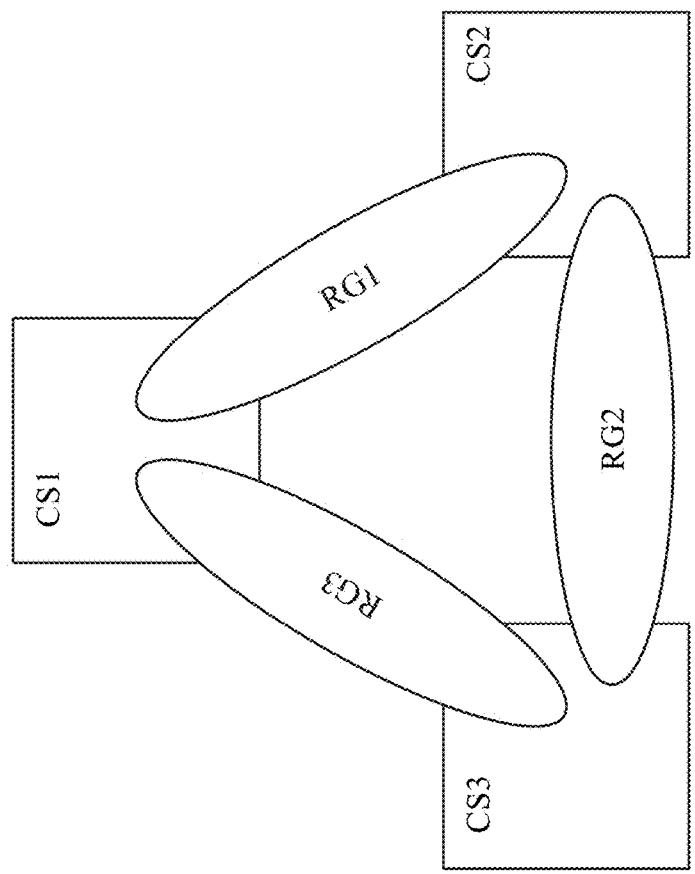
FIG. 6 is an example diagrammatic view of a cloud storage system that may be used with a CM process according to an example implementation of the disclosure.

As seen in FIG. 6, from the physical layout point of view, the cloud includes CS1, CS2, and CS3 clusters, and the replication unites all three clusters in one circle. Generally, all three clusters may run one version of server software with one version of the configuration. In some implementations, when CM process 10 is used to isolate some unsafe code path, e.g., disable garbage collection for user data, it may be isolated for all three clusters. In certain implementations, if this use case is not supported and the configuration is managed only at the CS cluster level (e.g., cluster level 504), the cloud administrator or a service engineer may need to manually update configuration N times, where N is the number of CS systems in the cloud. In some implementations, manual configuration update for several systems may be a time-consuming and an error-prone way to manage configuration. Thus, in some implementations, CM process 10 may enable configuration management without requiring manual configuration of each CS system in the cloud.

As seen in FIG. 6, from the logical point of view, there are three clouds, e.g., one cloud around each existing replication group shown. Generally, by default, all three clouds may share a single version of the configuration. In some implementations, there may be situations where configuration management is used to control some assumption made about an application, e.g., max write transaction duration, expected max object count, etc. In certain implementations, the corresponding values may be updated only within the replication group that services the application. In some situations, it may not be efficient or safe to propagate the new value to all replication groups. Thus, CM process 10 may enable support of configuration management at the replication group level.

Thus, the example system shown at FIG. 6 may have two dimensions: e.g., physical and logical. In the example, CM process 10 may enable configuration management to support the cloud-specific use cases while also supporting a use case when the configuration may need to be modified only for a particular cluster. Two or more clusters that are united by replication groups may have different hardware configurations, and the clusters may experience different loads. In some implementations, CM process 10 may be used to tune system performance, e.g., slow down some resource-demanding system process, and in some implementations the configuration parameters may be changed locally, e.g., at cluster level 504.

Figure 7:
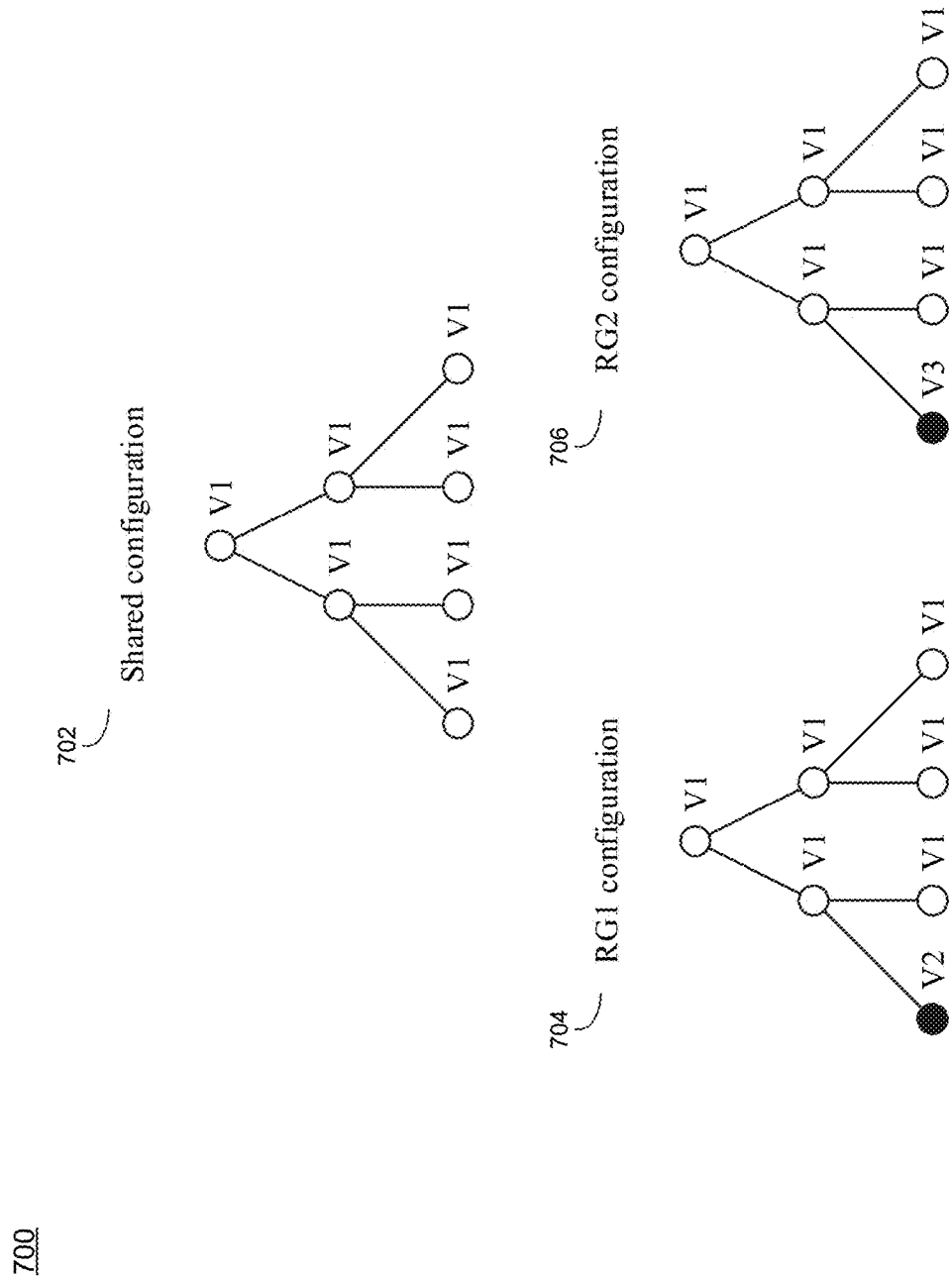
FIG. 7 is an example diagrammatic view of a configuration tree splitting that may be used with a CM process according to an example implementation of the disclosure.

As noted above, in other implementations, the cluster configuration may be organized as a tree structure. In some implementations, CM process 10 may share a single version of a configuration parameters tree with all the system components (e.g., clusters and RGs) and each configuration modification may be propagated to all the components by CM process 10. In certain implementations, when there is a need or desire to modify a configuration parameter for some particular cluster or RG, CM process 10 may split the configuration tree by this parameter in the corresponding dimension (e.g., physical for a cluster or logical for a RG). In some implementations, if the configuration tree is split by a parameter in some dimension, it may be further split in this dimension. An example implementation of a configuration tree splitting 700 is shown at FIG. 7.

In certain implementations, at the beginning, there may be a single configuration tree shared by all the system components, such as shared configuration tree 702. In some implementations, each configuration parameter may have a version V1. In some implementations, after a period of time, some configuration parameter value may be overridden for the replication group RG1, e.g., configuration tree for this given parameter splits in the logical dimension. In some implementations, the new version of this parameter for RG1 may be V2. From this point, in some implementations, there may be two configuration trees: shared configuration tree 702 and a configuration tree for RG1, such as RG1 configuration tree 704. In certain implementations, the value of the same parameter may be overridden once again for the replication group RG2, e.g., the configuration tree splits in the same logical dimension. In some implementations, the new version of this parameter for RG2 may be V3, as shown in RG2 configuration tree 706. In certain implementations, from this point there may be three configuration trees: a shared configuration tree, a configuration tree for RG1, and a configuration tree for RG 2.

In some implementations, to avoid possible conflicts, it may be forbidden to split a configuration tree by a single parameter in different dimensions. For example, if some configuration parameter value is overridden for the replication group RG1 (in the logical dimension), the value of the same configuration parameter may not be overridden for the cluster CS1 (in the physical dimension). Otherwise, in some implementations, there may be a conflict for services that run on the cluster CS1 and service the replication group RG1. For instance, CS1 may have a dedicated set of services that may support RG1, which for simplicity may be referred to in this example as the services. In the example, suppose there is a single version of the configuration that may be shared by all CSs and RGs. In the example, there may be some parameter with a version V1. In some implementations, after updating the parameter for CS1 (a version V2) and for RG1 (a version V3), there may need to be a decision as to what version of the parameter the services are supposed to use. In certain implementations, the decision may include, e.g., V2 because the services run on CS1, or V3 because the services belong to RG1. As such, In certain implementations, a conflict may exist. In some implementations, priorities may be introduced. For instance, CS configuration may have a priority over RG configuration, or vice versa. However, in some implementations, "rules" of this kind may be confusing, and it may be easier to forbid splitting in different dimensions.

In certain implementations, the configuration update may be applied to a plurality of cluster nodes in the cluster configuration. For instance, in some implementations, in a new cloud system, all its components (e.g., clusters and RGs) may share a single version of the configuration parameter tree. In other implementations, by default, any configuration update may be handled as a global configuration update, e.g., the new parameter value may become effective for all clusters and RGs. In some implementations, the CS cluster that receives 400 and handles the configuration update request may be responsible for propagating the new configuration to all clusters and RGs. In some implementations, after the cluster accepts the configuration update and stores 402 the new configuration version using its Shared Memory Service, CM process 10 (e.g., via the cluster) may distribute 406 the identical configuration update requests to all other clusters within the cloud. In some implementations, the global configuration update may be complete when all clusters accept the configuration update.

In some implementations, the configuration update may be limited to the first cluster. For instance, when the desired scope for a configuration update is a single CS cluster, it may be explicitly specified. For example, in certain implementations, when a user wants to update a value of some configuration parameter, the user may uses some client application (e.g., associated with CM process 10) to generate a request to the storage. In certain implementations, each storage may specify an interface for such requests. In some implementations, there may be a REST-based interface (or the like). In certain implementations, each request type supported may specify a set of mandatory and/or optional input parameters. In some implementations, for configuration update requests, there may be an optional input parameter called "scope" or the like, and the default value of this parameter may be, e.g., ALL. In some implementations, ALL may mean "update configuration for all the CSs and RGs." In certain implementations, the value RG may mean "update configuration for a given RG only." In some implementations, the value CS may mean "update configuration for a given CS only." In some implementations, if this is the case, CM process 10 (e.g., via the cluster) may accept the configuration update and store 402 the new configuration version using its Shared Memory Service. In some implementations, the corresponding configuration parameter may be marked as overridden for the cluster. In some implementations, CM process 10 (e.g., via the cluster) does not propagate the configuration update to other clusters within the cloud. In this example, the new configuration may only be effective for services that run on this cluster.

In other implementations, the configuration update may be limited to a single replication group. For instance, in some implementations, when the desired scope for a configuration update is a single RG it may be explicitly specified similarly as noted above. If this is the case, CM process 10 (e.g., via the cluster) may accept the configuration update and store 402 the new configuration version using its Shared Memory Service. The corresponding configuration parameter may be marked as overridden for the RG CM process 10 (e.g., via the cluster) may send the identical configuration update requests to be received 400 at all other clusters that protect that RG In this example, the new configuration may only be effective for services that serve that RG.

From the implementation point of view, it may be sufficient for CM process 10 to maintain a list of overridden configuration parameters with their current values for each system component (e.g., cluster or RG), at least in certain implementations. In some implementations, when a configuration client requests its configuration, the effective configuration may be constructed by CM process 10 using the following example sources: e.g., (1) Shared global configuration; (2) List of overridden configuration parameters for the cluster on which the client runs; and (3) List of overridden configuration parameters for the replication group the client services.

Thus, in some implementations, e.g., in a cloud environment, all clusters and RGs may share a single version of the configuration. However, In certain implementations, there may be some example exceptions as discussed above. For instance, in some implementations, an exception may be when CS software is tuned for a particular hardware, e.g., appliance, some configuration parameters may be overridden for a single CS cluster. In other example implementations, when CS software needs to be adopted for particular application needs, some configuration parameters may be overridden for a single RG that is used by the application.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving a change to a configuration parameter associated with a first cluster node of a plurality of cluster nodes in a cluster configuration, wherein the cluster configuration includes one or more configuration clients and one or more configuration API endpoints, wherein the one or more configuration clients and the one or more configuration API endpoints include a configuration client library, wherein the change to the configuration parameter includes a parameter update respective to an assumption about an application, wherein the parameter update respective to the assumption about the application includes at least one of an increase limit and a decrease limit respective to object creation, wherein the cluster configuration is organized as a tree structure, wherein receiving the change to the configuration parameter includes splitting the tree structure by the configuration parameter relative to a corresponding dimension, wherein the corresponding dimension includes at least one of a logical dimension and a physical dimension, wherein at least two different cluster nodes of the plurality of cluster nodes are configured for triggering at least two different state transitions at the same time, wherein triggering the at least two different state transitions includes:
registering a client-specified listener with the configuration client library;
sending a signal to the configuration client library to effectuate a snapshot of the cluster configuration;
calling, via the configuration client library, the client-specified listener to facilitate one or more cluster configuration changes; and
notifying the one or more configuration clients of the one or more cluster configuration changes;
storing, via the configuration client library of at least one of the one or more configuration clients and the one or more configuration API endpoints, the configuration parameter in a shared cluster memory; and
distributing the configuration parameter from the shared cluster memory to the cluster configuration.

2. The computer-implemented method of claim 1 wherein the configuration parameter includes at least one of a mode, a state, and a numerical parameter of at least one storage service running on the first cluster node.

3. The computer-implemented method of claim 1 wherein the cluster configuration is shown as a single view for each storage service running on the plurality of cluster nodes in the cluster configuration.

4. The computer-implemented method of claim 1 wherein a configuration update is applied to the plurality of cluster nodes in the cluster configuration.

5. The computer-implemented method of claim 4 wherein the configuration update is limited to the first cluster.

6. The computer-implemented method of claim 4 wherein the configuration update is limited to a single replication group.

7. The computer-implemented method of claim 1 wherein storing the configuration parameter in the shared cluster memory includes maintaining a list of one or more overridden configuration parameters resulting from splitting the tree structure by the configuration parameter relative to the corresponding dimension.

8. A computer program product residing on a non-transitory computer readable storage medium having a plurality of instructions stored thereon which, when executed across one or more processors, cause at least a portion of the one or more processor to perform operations comprising:
receiving a change to a configuration parameter associated with a first cluster node of a plurality of cluster nodes in a cluster configuration, wherein the cluster configuration includes one or more configuration clients and one or more configuration API endpoints, wherein the one or more configuration clients and the one or more configuration API endpoints include a configuration client library, wherein the change to the configuration parameter includes a parameter update respective to an assumption about an application, wherein the parameter update respective to the assumption about the application includes at least one of an increase limit and a decrease limit respective to object creation, wherein the cluster configuration is organized as a tree structure, wherein receiving the change to the configuration parameter includes splitting the tree structure by the configuration parameter relative to a corresponding dimension, wherein the corresponding dimension includes at least one of a logical dimension and a physical dimension, wherein at least two different cluster nodes of the plurality of cluster nodes are configured for triggering at least two different state transitions at the same time, wherein triggering the at least two different state transitions includes:
registering a client-specified listener with the configuration client library;
sending a signal to the configuration client library to effectuate a snapshot of the cluster configuration;
calling, via the configuration client library, the client-specified listener to facilitate one or more cluster configuration changes; and
notifying the one or more configuration clients of the one or more cluster configuration changes;
storing, via the configuration client library of at least one of the one or more configuration clients and the one or more configuration API endpoints, the configuration parameter in a shared cluster memory; and
distributing the configuration parameter from the shared cluster memory to the cluster configuration.

9. The computer program product of claim 8 wherein the configuration parameter includes at least one of a mode, a state, and a numerical parameter of at least one storage service running on the first cluster node.

10. The computer program product of claim 8 wherein the cluster configuration is shown as a single view for each storage service running on the plurality of cluster nodes in the cluster configuration.

11. The computer program product of claim 8 wherein a configuration update is applied to the plurality of cluster nodes in the cluster configuration.

12. The computer program product of claim 11 wherein the configuration update is limited to the first cluster.

13. The computer program product of claim 11 wherein the configuration update is limited to a single replication group.

14. The computer program product of claim 8 wherein storing the configuration parameter in the shared cluster memory includes maintaining a list of one or more overridden configuration parameters resulting from splitting the tree structure by the configuration parameter relative to the corresponding dimension.

15. A computing system including one or more processors and one or more memories configured to perform operations comprising:
receiving a change to a configuration parameter associated with a first cluster node of a plurality of cluster nodes in a cluster configuration, wherein the cluster configuration includes one or more configuration clients and one or more configuration API endpoints, wherein the one or more configuration clients and the one or more configuration API endpoints include a configuration client library, wherein the change to the configuration parameter includes a parameter update respective to an assumption about an application, wherein the parameter update respective to the assumption about the application includes at least one of an increase limit and a decrease limit respective to object creation, wherein the cluster configuration is organized as a tree structure, wherein receiving the change to the configuration parameter includes splitting the tree structure by the configuration parameter relative to a corresponding dimension, wherein the corresponding dimension includes at least one of a logical dimension and a physical dimension, wherein at least two different cluster nodes of the plurality of cluster nodes are configured for triggering at least two different state transitions at the same time, wherein triggering the at least two different state transitions includes:
registering a client-specified listener with the configuration client library;
sending a signal to the configuration client library to effectuate a snapshot of the cluster configuration;
calling, via the configuration client library, the client-specified listener to facilitate one or more cluster configuration changes; and
notifying the one or more configuration clients of the one or more cluster configuration changes;
storing, via the configuration client library of at least one of the one or more configuration clients and the one or more configuration API endpoints, the configuration parameter in a shared cluster memory; and
distributing the configuration parameter from the shared cluster memory to the cluster configuration.

16. The computing system of claim 15 wherein the configuration parameter includes at least one of a mode, a state, and a numerical parameter of at least one storage service running on the first cluster node.

17. The computing system of claim 15 wherein the cluster configuration is shown as a single view for each storage service running on the plurality of cluster nodes in the cluster configuration.

18. The computing system of claim 15 wherein a configuration update is applied to the plurality of cluster nodes in the cluster configuration.

19. The computing system of claim 18 wherein the configuration update is limited to the first cluster.

20. The computer-implemented method of claim 1, wherein the one or more configuration clients and the one or more configuration API endpoints are communicatively coupled to the shared cluster memory.

* * * * *